US009273959B2

(12) United States Patent
Kumagai et al.

(10) Patent No.: US 9,273,959 B2
(45) Date of Patent: Mar. 1, 2016

(54) SURVEYING INSTRUMENT

(71) Applicant: Kabushiki Kaisha TOPCON, Itabashi-ku, Tokyo-to (JP)

(72) Inventors: Kaoru Kumagai, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 112 days.

(21) Appl. No.: 14/197,738

(22) Filed: Mar. 5, 2014

(65) Prior Publication Data
US 2014/0259709 A1 Sep. 18, 2014

(30) Foreign Application Priority Data
Mar. 15, 2013 (JP) .................. 2013-053700

(51) Int. Cl.
*G01C 15/00* (2006.01)
(52) U.S. Cl.
CPC .............. *G01C 15/002* (2013.01); *G01C 15/00* (2013.01); *G01C 15/008* (2013.01)
(58) Field of Classification Search
CPC ........................... G01C 15/002; G01C 15/008
USPC ............................................ 33/290, 291, 292
See application file for complete search history.

(56) References Cited

U.S. PATENT DOCUMENTS

| 5,991,706 A * | 11/1999 | Tsukamoto | G01C 1/02 33/1 T |
| 6,256,006 B1 * | 7/2001 | Yamamoto | G09G 3/36 345/101 |
| 6,859,269 B2 | 2/2005 | Ohtomo et al. | |
| 7,443,495 B2 * | 10/2008 | Hertzman | G01C 15/00 356/139.04 |
| 7,564,488 B2 * | 7/2009 | Kumagai | G01C 15/002 348/207.99 |
| 7,830,501 B2 * | 11/2010 | Kludas | G01C 11/06 356/139.03 |
| 8,321,167 B2 | 11/2012 | Haijima et al. | |
| 9,103,678 B2 * | 8/2015 | Kumagai | G01C 15/002 |
| 2003/0179361 A1 | 9/2003 | Ohtomo et al. | |
| 2009/0171610 A1 | 7/2009 | Haijima et al. | |
| 2013/0155225 A1 * | 6/2013 | Kumagai | G01C 15/002 348/137 |
| 2014/0327920 A1 * | 11/2014 | Bridges | G01B 11/002 356/614 |
| 2015/0052765 A1 * | 2/2015 | Kumagai | G01C 15/006 33/290 |
| 2015/0185008 A1 * | 7/2015 | Nishita | G01C 15/002 33/293 |

FOREIGN PATENT DOCUMENTS

| DE | 8628831 U1 | 5/1987 |
| EP | 2557392 A1 | 2/2013 |
| JP | 2002-310657 A | 10/2002 |

(Continued)

OTHER PUBLICATIONS

European communication dated Jul. 18, 2014 in corresponding European patent application No. 14159287.3.

*Primary Examiner* — Christopher Fulton
(74) *Attorney, Agent, or Firm* — Nields, Lemack & Frame, LLC

(57) ABSTRACT

The invention provides a surveying instrument (1) which has a measuring unit comprises an operation control panel (4) rotatably mounted on the measuring unit with vertical axis as the center with respect to the measuring unit, and a relative angle detecting means for detecting a relative angle of the operation control panel and the measuring unit, wherein the operation control panel is so arranged that a command is issued to relatively rotate the measuring unit based on the relative angle detected by the relative angle detecting means.

17 Claims, 5 Drawing Sheets

(56) References Cited

FOREIGN PATENT DOCUMENTS

| JP | 2003-5004 | A | 1/2003 |
| JP | 2003-279351 | A | 10/2003 |
| JP | 2008-241529 | A | 10/2008 |
| JP | 2009-156773 | A | 7/2009 |

* cited by examiner

SURVEYING INSTRUMENT

BACKGROUND OF THE INVENTION

The present invention relates to a surveying instrument, in which an operation control panel is used for operating an instrument having a movable unit such as a surveying instrument.

For an operation control panel used as a man-machine interface, there are increasing demands to have higher operability of the device. Further, in the field of surveying instrument, there are now strong demands on an operation control panel, by which it is possible to improve operability of the surveying instrument.

SUMMARY OF THE INVENTION

It is an object of the present invention to provide a surveying instrument, wherein in an operation of the operation control panel, an operation sensibility of an operator and a movement of device match well each other and an operability can be improved by providing the operation control panel.

To attain the above object, the surveying instrument according to the present invention has a measuring unit comprising an operation control panel rotatably mounted about a vertical axis on the measuring unit, wherein the vertical axis is the center of the measuring unit, and a relative angle detecting means for detecting a relative angle of the operation control panel and the measuring unit, wherein the operation control panel is so arranged that a command is issued to relatively rotate the measuring unit based on the relative angle detected by the relative angle detecting means.

Further, in the surveying instrument according to the present invention, the operation control panel further comprises an operation panel, being rotatable around horizontal axis as the center of rotation, wherein the operation panel has vertical rotation angle detecting means, and issues a control command to the surveying instrument to rotate vertically based on a vertical angle detected by the vertical rotation angle detecting means.

Further, in the surveying instrument according to the present invention, the operation panel is designed as freely attachable and removable, has a posture sensor, and issues a control command for horizontal rotation and vertical rotation to the surveying instrument based on a detection result of the posture sensor.

Further, in the surveying instrument according to the present invention, the operation panel has a display unit to fulfill function as a touch panel and issues a control command for crude control mode based on change of posture of the operation panel, and based on an instruction from the operation panel is adapted to be issued as a control command for fine control mode.

Further, the surveying instrument according to the present invention further comprises a leveling unit to fulfill leveling function, a rotation base where a telescope unit is provided, an operation control panel provided rotatably in horizontal direction with respect to the rotation base, a horizontal rotation driving unit for rotating the rotation base in horizontal direction, and a main element control unit for controlling the horizontal rotation driving unit, wherein the operation control panel has a relative angle detector for detecting relative rotation angle with respect to the rotation base, and the main element control unit controls the horizontal rotation driving unit so that the rotation base is rotated in horizontal direction based on relative rotation angle detected by the relative angle detector.

Further, in the surveying instrument according to the present invention, the rotation base comprises the telescope unit rotatably supported in vertical direction and a vertical rotation driving unit for rotating the telescope unit in vertical direction, wherein the operation control panel comprises a rotary operation support rotatable in horizontal direction with respect to the rotation base, an operation panel rotatably mounted as rotatable in vertical direction on the rotary operation support, and a vertical angle detecting means for detecting vertical angle of the operation panel, and wherein the main element control unit controls the vertical rotation driving unit so as to vertically rotate the telescope unit based on a vertical angle detected by the vertical angle detecting means.

Further, in the surveying instrument according to the present invention, the rotation base has a main communication unit, the operation control panel has the operation panel designed as freely attachable and removable, the operation panel has a posture sensor and an operation panel communication unit, a detection result of the posture sensor is transmitted from the operation panel communication unit to the main element control unit, and wherein the main element control unit controls the horizontal rotation driving unit and the vertical rotation driving unit based on a detection result of the posture sensor received via the main communication unit.

Further, in the surveying instrument according to the present invention, the main element control unit can control the horizontal rotation driving unit and the vertical rotation driving unit in two modes of crude control mode and fine control mode, wherein the operation panel has a display unit to fulfill function as a touch panel, issues a control command for crude control mode based on a posture change of the operation panel and a control command for fine control mode based on an instruction from the operation panel.

Further, in the surveying instrument according to the present invention, the relative angle detector has a reference position and detects a relative rotation displacement from the reference position and outputs as a relative rotation angle.

Further, in the surveying instrument according to the present invention, the rotation base has a horizontal rotation shaft rotated integrally and a horizontal angle encoder for detecting horizontal angle is provided inside the horizontal rotation shaft and wherein the telescope unit has a vertical rotation shaft rotated integrally and a vertical angle encoder for detecting vertical angle is provided inside the vertical rotation shaft.

According to the present invention, the surveying instrument which has a measuring unit comprises an operation control panel rotatably mounted on the measuring unit with vertical axis as the center with respect to the measuring unit, and a relative angle detecting means for detecting a relative angle of the operation control panel and the measuring unit, wherein the operation control panel is so arranged that a command is issued to relatively rotate the measuring unit based on the relative angle detected by the relative angle detecting means. As a result, it is possible to operate the surveying instrument by moving the operation control panel according to the sense of the operator. This leads to good matching between operator's sense and movement of the telescope unit and contributes to the improvement of operability.

Further, according to the present invention, the operation control panel further comprises an operation panel, being rotatable around horizontal axis as the center of rotation, wherein the operation panel has vertical rotation angle detecting means, and issues a control command to the surveying instrument to rotate vertically based on a vertical angle detected by the vertical rotation angle detecting means. As a result, it is possible to operate the surveying instrument by moving the operation control panel according to the sense of the operator. This leads to good matching between operator's sense and movement of the telescope unit and contributes to the improvement of operability.

Further, according to the present invention, the operation panel is designed as freely attachable and removable, has a posture sensor, and issues a control command for horizontal rotation and vertical rotation to the surveying instrument based on a detection result of the posture sensor. As a result, it is possible to perform remote control operation at a position distant from the surveying instrument.

Further, according to the present invention, the operation panel has a display unit to fulfill function as a touch panel and issues a control command for crude control mode based on change of posture of the operation panel, and based on an instruction from the operation panel is adapted to be issued as a control command for fine control mode. As a result, in a case where it is wanted to roughly align the collimating direction of the telescope unit, the operation control panel is moved according to operator's sense, and a fine adjustment is performed by inputting from the operation panel. This contributes to the improvement of operability and to the achievement of fine adjustment.

Further, according to the present invention, which further comprises a leveling unit to fulfill leveling function, a rotation base where a telescope unit is provided, an operation control panel provided rotatably in horizontal direction with respect to the rotation base, a horizontal rotation driving unit for rotating the rotation base in horizontal direction, and a main element control unit for controlling the horizontal rotation driving unit, wherein the operation control panel has a relative angle detector for detecting relative rotation angle with respect to the rotation base, and the main element control unit controls the horizontal rotation driving unit so that the rotation base is rotated in horizontal direction based on relative rotation angle detected by the relative angle detector. As a result, it is possible to operate the surveying instrument by moving the operation control panel according to the sense of the operator. This leads to good matching between operator's sense and movement of the telescope unit and contributes to the improvement of operability.

Further, according to the present invention, the rotation base comprises the telescope unit rotatably supported in vertical direction and a vertical rotation driving unit for rotating the telescope unit in vertical direction, wherein the operation control panel comprises a rotary operation support rotatable in horizontal direction with respect to the rotation base, an operation panel rotatably mounted as rotatable in vertical direction on the rotary operation support, and a vertical angle detecting means for detecting vertical angle of the operation panel, and wherein the main element control unit controls the vertical rotation driving unit so as to vertically rotate the telescope unit based on a vertical angle detected by the vertical angle detecting means. As a result, it is possible to operate the surveying instrument by moving the operation control panel according to the sense of the operator. This leads to good matching between operator's sense and movement of the telescope unit and contributes to the improvement of operability.

Further, according to the present invention, the rotation base has a main communication unit, the operation control panel has the operation panel designed as freely attachable and removable, the operation panel has a posture sensor and an operation panel communication unit, a detection result of the posture sensor is transmitted from the operation panel communication unit to the main element control unit, and wherein the main element control unit controls the horizontal rotation driving unit and the vertical rotation driving unit based on a detection result of the posture sensor received via the main communication unit. As a result, it is possible to perform remote control operation at a position distant from the surveying instrument.

Further, according to the present invention, the main element control unit can control the horizontal rotation driving unit and the vertical rotation driving unit in two modes of crude control mode and fine control mode, wherein the operation panel has a display unit to fulfill function as a touch panel, issues a control command for crude control mode based on a posture change of the operation panel and a control command for fine control mode based on an instruction from the operation panel. As a result, in a case where it is wanted to roughly align the collimating direction of the telescope unit, the operation control panel is moved according to operator's sense, and a fine adjustment is performed by inputting from the operation panel. This contributes to the improvement of operability and to the achievement of fine adjustment.

Further, according to the present invention, the relative angle detector has a reference position and detects a relative rotation displacement from the reference position and outputs as a relative rotation angle. As a result, the angle to be detected by the relative angle detector may be in a limited range and the relative angle detector can be lower cost.

Furthermore, according to the present invention, the rotation base has a horizontal rotation shaft rotated integrally and a horizontal angle encoder for detecting horizontal angle is provided inside the horizontal rotation shaft and wherein the telescope unit has a vertical rotation shaft rotated integrally and a vertical angle encoder for detecting vertical angle is provided inside the vertical rotation shaft. As a result, the surveying instrument can be miniaturized.

DETAILED DESCRIPTION OF THE PREFERRED EMBODIMENT

Description will be given below on an embodiment of the invention by referring to the attached drawings.

Figure 1:
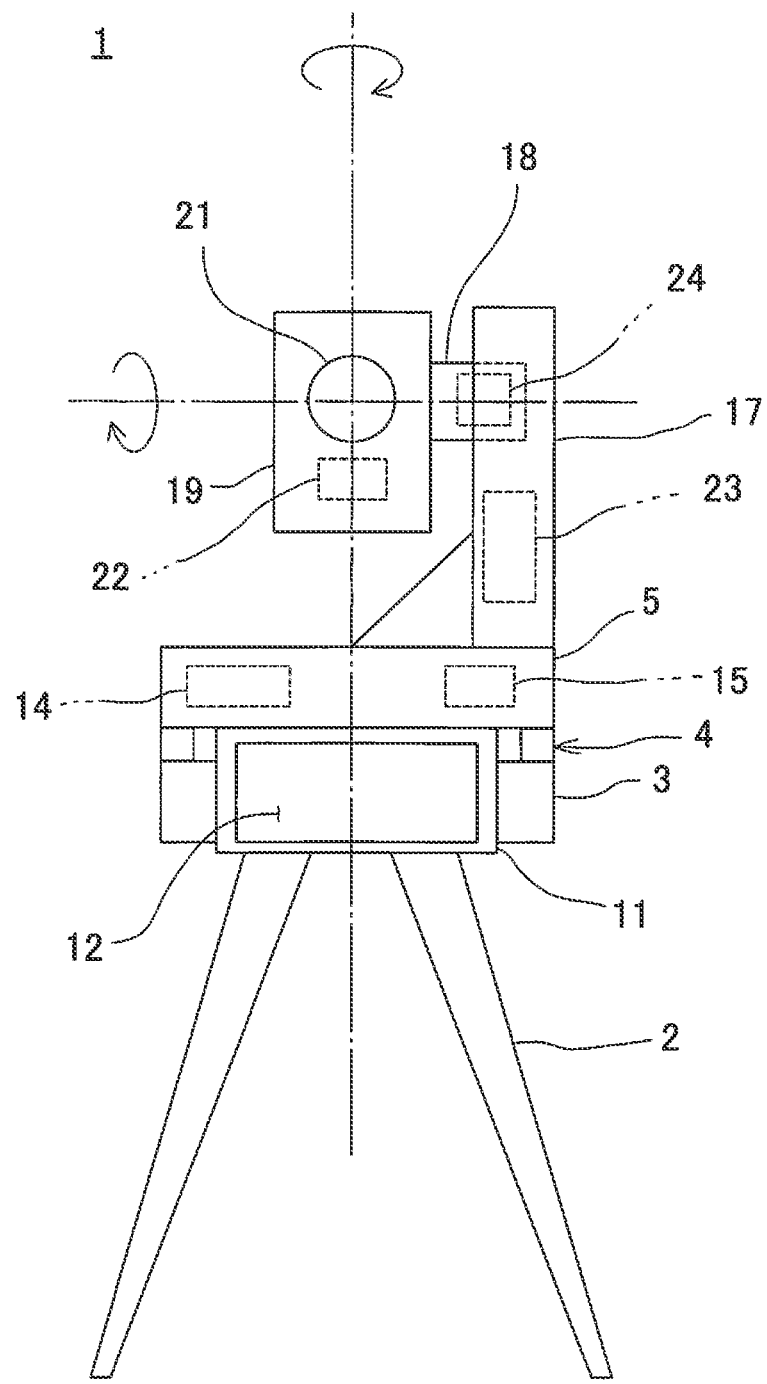
FIG. 1 is an approximate front view of a surveying instrument according to an embodiment of the invention.
Figure 2:
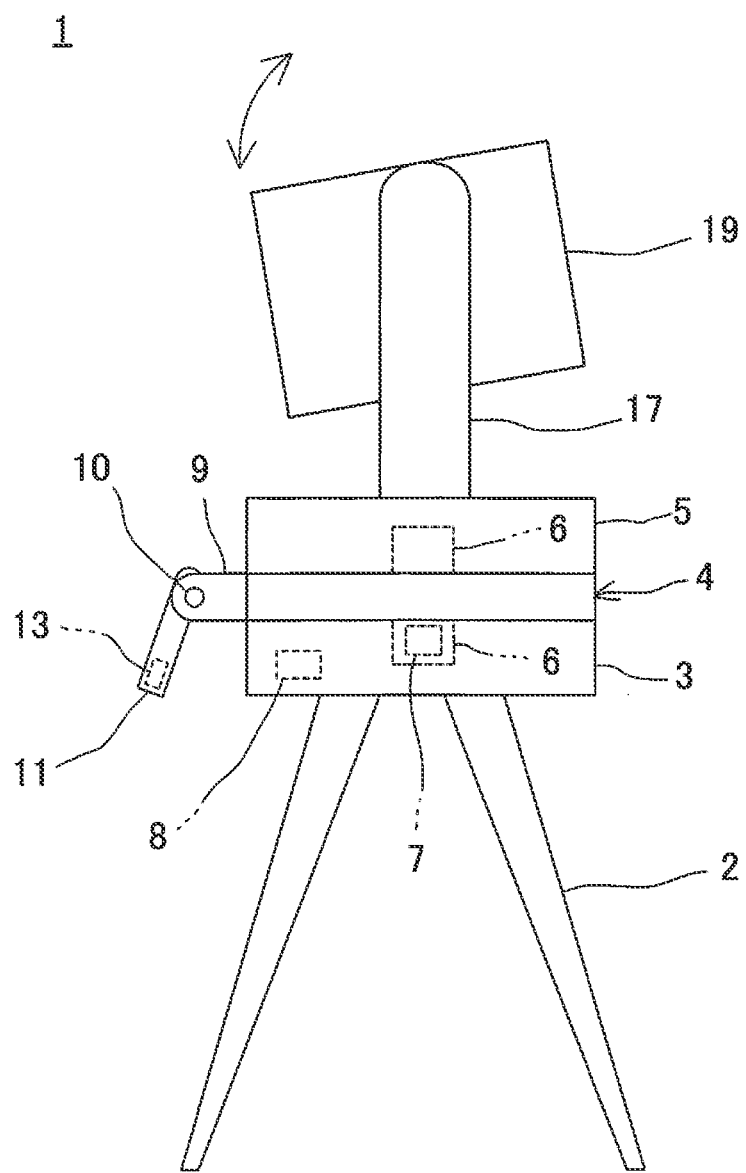
FIG. 2 is an approximate side view of the surveying instrument.

First, referring to FIG. 1 and FIG. 2, description will be given on general features of a surveying instrument 1 according to the present embodiment.

A leveling unit 3 is provided on an upper end of a tripod 2. An operation control panel 4 is mounted on the leveling unit 3, and a rotation base 5 is disposed on the operation control panel 4. From a lower surface of the rotation base 5, a horizontal rotation shaft 6 is extended, and the horizontal rotation shaft 6 passes through the operation control panel 4 and is rotatably supported by the leveling unit 3.

The operation control panel 4 is rotatably supported on the horizontal rotation shaft 6 so that the operation control panel 4 can be freely rotated with respect to the leveling unit 3 and the rotation base 5. Further, loading torque as required is given to the rotation of the operation control panel 4 with respect to the horizontal rotation shaft 6. By applying rotating force bigger than the loading torque on the operating control panel 4, the operation control panel 4 is rotated around the horizontal rotation shaft 6. Also, it is so arranged that the operation control panel 4 can be stopped at any position as desired by removing the rotating force and the stopping position can be maintained.

With respect to the loading torque, it may be conceived that a friction member is pressed on the horizontal rotation shaft 6 and friction resistance is given to the rotation.

Also, a horizontal angle encoder 7 is provided as horizontal rotation angle detecting means inside the horizontal rotation shaft 6, and the horizontal angle encoder 7 detects rotation angle of the rotation base 5 to the leveling unit 3.

The leveling unit 3 has a leveling mechanism (not shown) to make the leveling unit 3 horizontal and a tilt sensor 8, and the leveling mechanism is arranged so as to make the leveling unit 3 horizontal based on the results of detection by the tilt sensor 8.

The operation control panel 4 has a rotary operation support 9 rotatable around the horizontal rotation shaft 6 and an operation panel 11 attached to the rotary operation support 9 via a horizontal shaft 10. The operation panel 11 is so designed that the operation panel 11 can be rotated around the horizontal shaft 10 and integrally with the horizontal shaft 10 in direction of elevation.

Further, the operation panel 11 is so designed that the operation panel 11 can be freely attached to and removed from the rotary operation support 9. For instance, the horizontal shaft 10 can be freely connected to and disconnected from the operation panel 11. By disconnecting the connection between the horizontal shaft 10 and the operation panel 11, the operation panel 11 can be removed from the rotary operation support 9.

The operation panel 11 has a display unit 12, and a tilt sensor 13 for detecting tilt angle with respect to a horizontal plane is installed inside the operation panel 11. An operation panel rotation angle detector 20 (see FIG. 3) is arranged inside the rotary operation support 9, and the operation panel rotation angle detector 20 detects elevation angle of the horizontal shaft 10. The operation panel rotation angle detector 20 may be arranged on the operation panel 11. The tilt sensor 13 and the operation panel rotation angle detector 20 are vertical angle detecting means for detecting tilt angle or vertical angle of the operation panel 11. Further, either one of the tilt sensor 13 and the operation panel rotation angle detector 20 may not be used.

The display unit 12 is designed as a touch panel. Operation information is inputted from the display unit 12, and on the display unit 12, a measurement result, informations relating to measurement such as measurement condition, etc., or a state of measurement, a direction of measurement (i.e. horizontal angle, elevation angle of sighting direction of a telescope unit 19 and distance), an image in the measurement direction, etc. are displayed.

Inside the rotation base 5, a horizontal rotation driving unit 15 is provided. The horizontal rotation driving unit 15 rotates the rotation base 5 around the horizontal rotation shaft 6 with respect to the leveling unit 3. On the rotation base 5, a frame case 17 is mounted in vertical direction, and a vertical rotation shaft 18 with a horizontal center line is provided on the frame case 17. The telescope unit 19 is rotatably mounted on the frame case 17 via the vertical rotation shaft 18. In the frame case 17, a vertical rotation driving unit 23 is incorporated and the telescope unit 19 is rotated in vertical direction by the vertical rotation driving unit 23 with the vertical rotation shaft 18 as the center.

The telescope unit 19 has a sight telescope 21. The sight telescope 21 has a viewing angle of about 5° and is used for sighting a measuring point. It is so arranged that sighting point of the sight telescope 21 is indicated by a reticule (not shown) provided on the sight telescope 21.

An image pickup unit 22 is incorporated in the telescope unit 19, and an image in sighting direction can be picked up via the sight telescope 21. The image pickup unit 22 has sensors such as CCD, CMOS, etc. as image pickup elements, and can output a digital image data.

The horizontal rotation driving unit 15 and the vertical rotation driving unit 23 make up together a rotation driving unit. The rotary driving unit can turn the telescope unit 19 in a direction as desired by cooperative movement of horizontal rotation of the horizontal rotation driving unit 15 and vertical rotation of the vertical rotation driving unit 23.

An electro-optical distance meter (EDM) 25 is incorporated in the telescope unit 19 (see FIG. 4), and optical system of the electro-optical distance meter 25 is commonly used with optical system of the image pickup unit 22. On the vertical rotation shaft 18, a vertical angle encoder 24 is provided as vertical rotation angle detecting means and a rotation angle of the vertical rotation shaft 18, i.e. an elevation angle of sight optical axis of the telescope unit 19, can be detected.

Inside the rotation base 5, a main element control unit 14 is provided. If it is convenient from the viewpoint of the space available, the main element control unit 14 may be provided at the other component such as the leveling unit 3, the telescope unit 19, etc.

Based on operation input from the operation panel 11, the main element control unit 14 can perform operations such as: a control of the horizontal rotation driving unit 15 and the vertical rotation driving unit 23, a control of distance measurement by the electro-optical distance meter 25, measurements of horizontal angle and vertical angle based on detection results of the horizontal angle encoder 7 and the vertical angle encoder 24, and acquisition of images by the image pickup unit 22.

Figure 3:
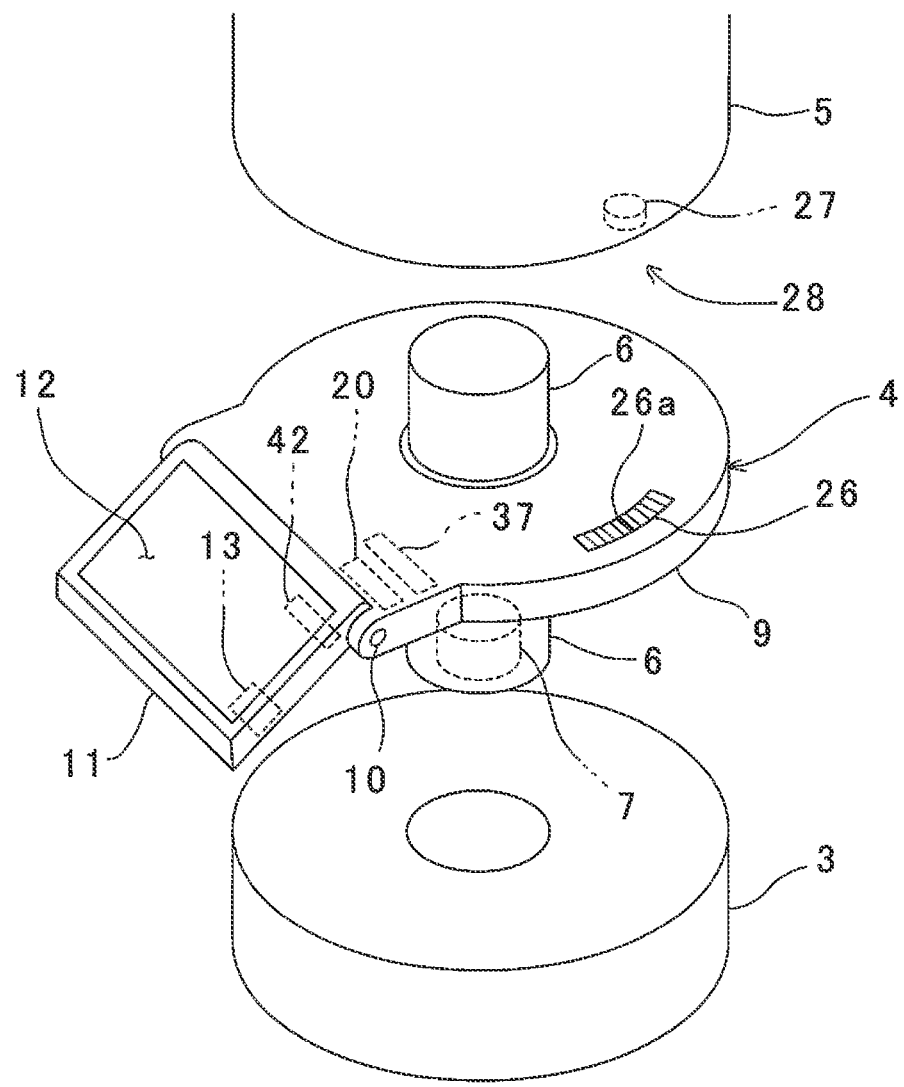
FIG. 3 is an exploded perspective view of an operation control panel of the surveying instrument.

As shown in FIG. 3, a scale 26 in circular shape around rotation center is provided on an upper surface of the rotary operation support 9, and a rotation detecting sensor 27 is disposed on lower surface of the rotation base 5—at a position face to face to the scale 26. It may be so arranged that the scale 26 may be disposed on lower surface of the rotation base 5 and the rotation detecting sensor 27 may be disposed on the rotary operation support 9.

The scale 26 has a reference position 26a, and the rotation detecting sensor 27 is so arranged that the rotation detecting sensor 27 detects a rotation angle of a predetermined range having the reference position 26a as the center, e.g. it can detect an angle of 0±10°. Therefore, the rotation detecting sensor 27 detects a relative rotation angle 0±10° with respect to rotating position (rotation angle) of the rotation base 5. A detection result of the rotation detecting sensor 27 is inputted to the main element control unit 14. The scale 26 and the rotation detecting sensor 27 make up together a relative angle detector 28 used as relative angle detecting means. The relative angle detector 28 may be disposed between the horizontal rotation shaft 6 and the rotary operation support 9, and may detect change of relative angle of the rotary operation support 9 and the horizontal rotation shaft 6.

Figure 4:
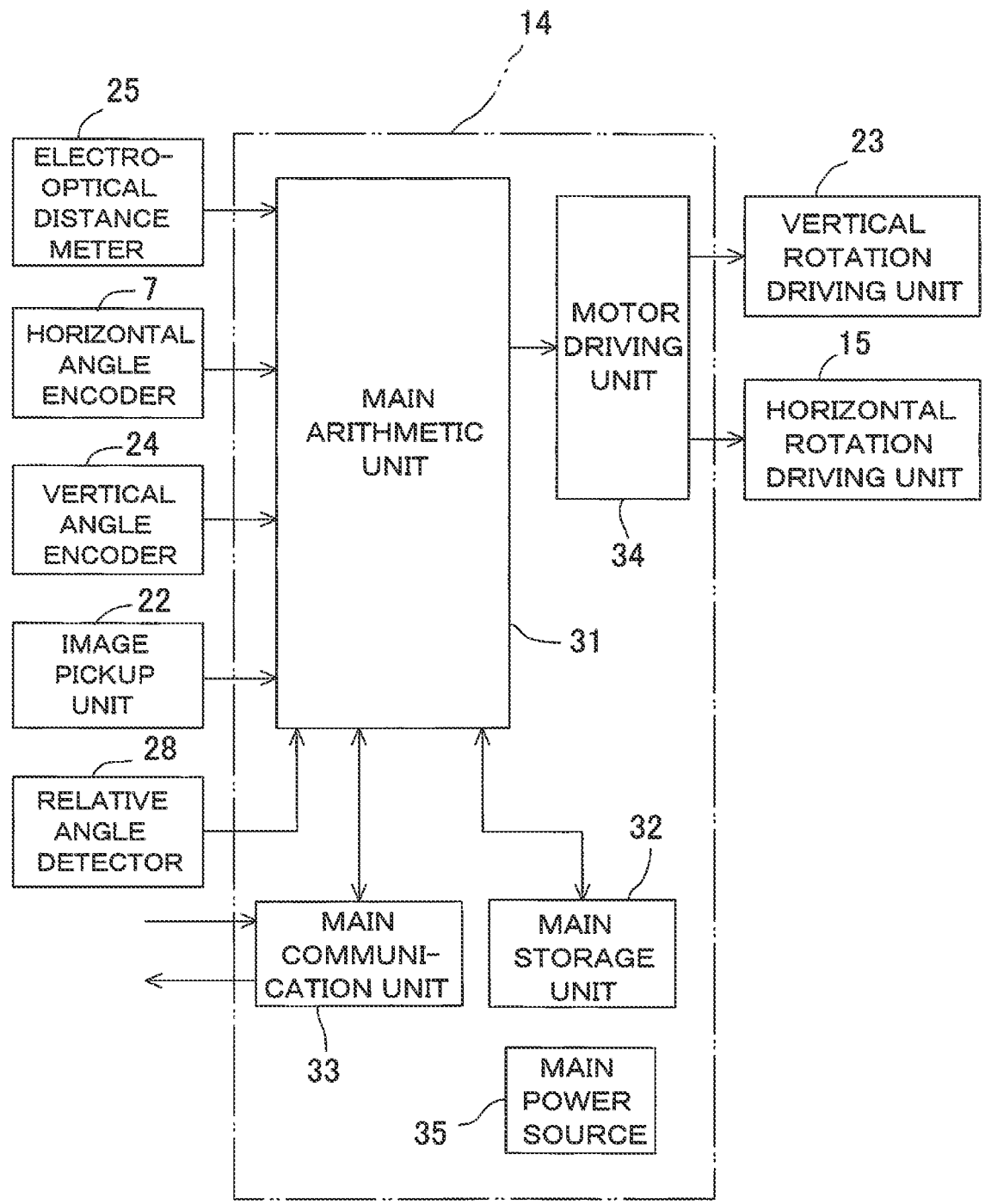
FIG. 4 is a block diagram of a main element control unit of the surveying instrument.
Figure 5:
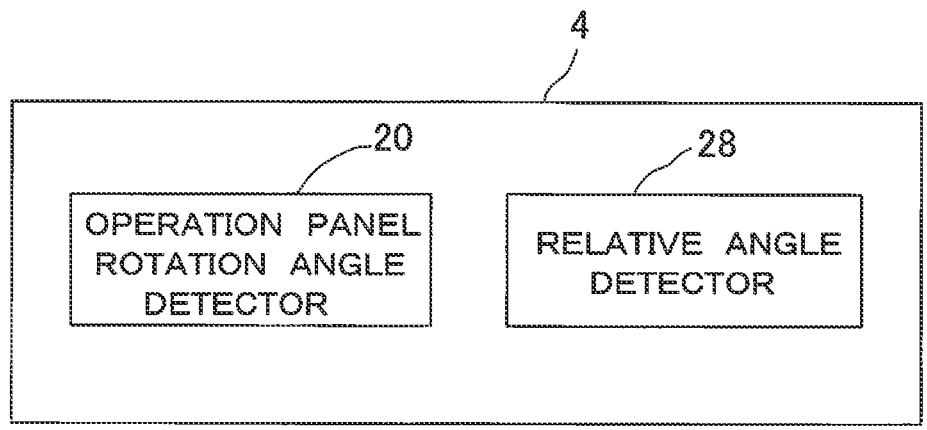
FIG. 5 is a block diagram of an operation control panel of the surveying instrument.
Figure 6:
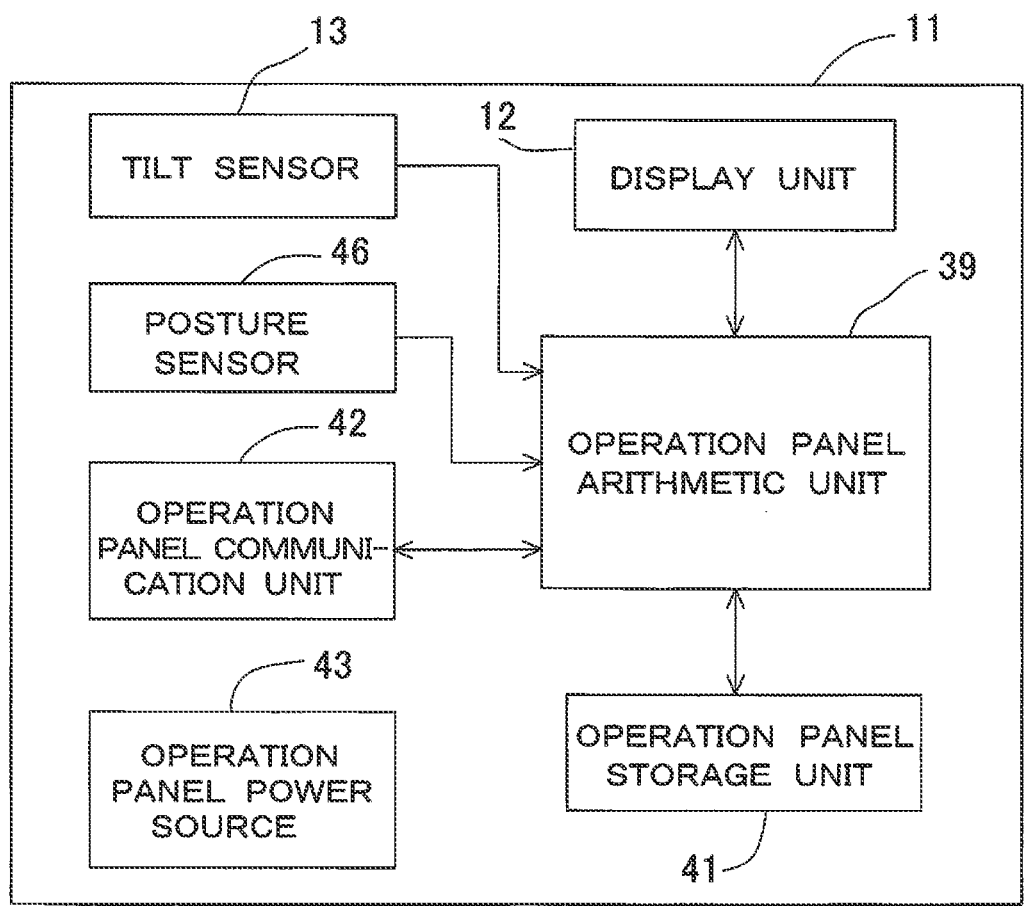
FIG. 6 is a block diagram of an operation panel of the surveying instrument.

Referring to FIG. 4 and FIG. 5, description will be given on control system of the surveying instrument.

First, description will be given on the rotation base 5.

The main element control unit 14 primarily comprises a main arithmetic unit 31, a main storage unit 32, a main communication unit 33, a motor driving unit 34, and a main power source 35. The main power source 35 supplies electric power to the main arithmetic unit 31, the main storage unit 32, the main communication unit 33, the horizontal rotation driving unit 15, the vertical rotation driving unit 23, etc.

Various types of programs are stored in the main storage unit 32: e.g. a distance measuring program for measuring distance by controlling the electro-optical distance meter 25, a driving control program for driving and controlling the horizontal rotation driving unit 15 and the vertical rotation driving unit 23 based on signals inputted from the operation panel 11, a transmission program for controlling transmission, etc. The driving control program is made up by two modes of control programs.

As to be described later, the driving control program has a crude control program and a fine control program. The crude control program drives and controls the horizontal rotation driving unit 15 and the vertical rotation driving unit 23 based on moving (displacement) of the operation panel 11. Further, the fine control program finely controls the horizontal rotation driving unit 15 and the vertical rotation driving unit 23 based on instructions inputted from the display unit 12.

The main element control unit 14 measures distance by controlling the electro-optical distance meter 25 and acquires images by controlling the image pickup unit 22. Images acquired and the result of distance measurement are stored in the main storage unit 32.

The signals from the horizontal angle encoder 7, the vertical angle encoder 24, and the relative angle detector 28 are inputted to the main element control unit 14.

Driving control commands to drive and control the horizontal rotation driving unit 15 and the vertical rotation driving unit 23 are outputted from the main arithmetic unit 31 to the motor driving unit 34. In response to the driving control command, the motor driving unit 34 drives the horizontal rotation driving unit 15 and the vertical rotation driving unit 23. The main communication unit 33 gives and takes signals to and from an operation panel communication unit 42 as to be described later. For the giving and the taking of the signals, communication means such as wireless communication, wired communication, etc. are used.

As described above, the operation control panel 4 comprises the rotary operation support 9 and the operation panel 11. The operation panel rotation angle detector 20 for detecting an elevation angle of the operation panel 11 is provided in the rotary operation support 9, and the relative angle detector 28 is disposed between the rotary operation support 9 and the rotation base 5. A rotary operation support communication unit 37 is provided in the rotary operation support 9. The rotary operation support communication unit 37 gives and takes signals to and from an operation panel communication unit 42 as to be described later, and signals can also be given and taken between the rotary operation support communication unit 37 and the main communication unit 33.

The operation panel 11 primarily comprises an operation panel arithmetic unit 39, an operation panel storage unit 41, an operation panel communication unit 42, an operation panel power source 43, a display unit 12, a tilt sensor 13, and a posture sensor 46.

As the posture sensors 46, an acceleration sensor, a gyro, etc. are used. The posture sensor 46 detects and outputs a tilting direction and a tilt angle, and the posture sensor 46 fulfills the function as a vertical rotation angle detecting means, and also fulfills the function as a horizontal angle detecting means.

Various types of programs are stored in the operation panel storage unit 41. These programs include: a program for preparing commands for operation based on the results detected by the tilt sensor 13 and the posture sensor 46, a transmission program for transmitting commands to the main element control unit 14 via the operation panel communication unit 42, and other programs.

As described above, the display unit 12 is designed as a touch panel and can input instructions to operate the surveying instrument 1 from the display unit 12.

The tilt sensor 13 mainly detects rotation angle (elevation angle) around the horizontal shaft 10 as a center under the condition that the operation panel 11 is attached to the rotary operation support 9. Based on the results of detection by the tilt sensor 13, a command for operation is prepared by the operation panel arithmetic unit 39, and the command is transmitted to the main element control unit 14 via the operation panel communication unit 42.

Under the condition where the operation panel 11 is removed from the rotary operation support 9, the posture sensor 46 primarily performs detection. Based on direction, tilting, etc., the operation panel arithmetic unit 39 prepares commands for operation, and the commands are transmitted to the main element control unit 14 via the operation panel communication unit 42.

Description will be given now on operation.

First, description will be given on operation of the surveying instrument 1 under the condition that the operation panel 11 is attached to the rotary operation support 9.

Guidance or operation menus for operating the surveying instrument 1 are displayed on the display unit 12. Instructions necessary for performing measurement by the surveying instrument 1 may be given from the display unit 12.

As to be described below, the movement for operating the surveying instrument 1 is directly given to the operation panel 11 and the surveying instrument 1 may be operated so as to respond to the movement as given.

In a case where the telescope unit 19 is to be rotated in horizontal direction, the operation panel 11 is rotated in horizontal direction.

The operation control panel 4 is relatively rotated with respect to the rotation base 5. Relative rotation angle is detected by the relative angle detector 28, and the result of detection is outputted to the main element control unit 14. The main element control unit 14 drives the horizontal rotation driving unit 15 so that relative rotation angle as detected from the relative angle detector 28 will be zero. Therefore, the rotation base 5 follows the rotation of the operation control panel 4 with some delay. Under the condition that rotation of the operation control panel 4 is stopped, a position of the rotation base 5 is determined at a position where the rotation detecting sensor 27 has detected the reference position 26a.

If it is so arranged that follow-up speed is increased in proportion to the increase of relative angle, the rotation detecting sensor 27 can be prevented from going out of detection range of the scale 26 even when the operation panel 11 is quickly rotated.

Rotation angle (hereinafter, referred as "absolute rotation angle") of the rotation base 5 to the leveling unit 3 is detected by the horizontal angle encoder 7, and an absolute rotation angle of the rotation base 5 as positioned is displayed on the display unit 12.

According to the positioning of the rotation base 5, a horizontal angle of the telescope unit 1 is determined.

Under the condition that the rotation base 5 is positioned, an instruction to lock the horizontal rotation driving unit 15 may be inputted from the display unit 12. By locking the horizontal rotation driving unit 15, interlocking between the operation control panel 4 and the rotation base 5 is separated, and the operation control panel 4 can be rotated by itself. Therefore, the operation panel 11 can be set at such position that operator can easily carry out the operation.

Further, in a case where the lock of the horizontal rotation driving unit 15 is unlocked and in a condition where the rotation detecting sensor 27 cannot detect the scale 26, the main element control unit 14 drives the horizontal rotation driving unit 15 and rotates the rotation base 5 in a direction as required, and performs searching operation of the rotation detecting sensor 27. At the moment when the rotation detecting sensor 27 detects the reference position 26*a*, searching operation is terminated.

In a case where the elevation angle of the telescope unit 19 is to be determined, the operation panel 11 is tilted in a direction, in which the telescope unit 19 is to be moved, around the horizontal axis 10. A tilt angle of the operation panel 11 is detected by the operation panel rotation angle detector 20, and a detection result is inputted to the main element control unit 14.

Based on the tilt angle detected by the operation panel rotation angle detector 20, the main element control unit 14 drives the vertical rotation driving unit 23. The tilt angle is displayed on the display unit 12. The image as photographed by the image pickup unit 22 is displayed on the display unit 12, and it is possible to judge a sighting condition of the sight telescope 21 based on the image as displayed.

When the point to be measured is turned to a condition where the point to be measured is included within a predetermined range with respect to the sighting position, the operation control panel 4 changes over from the crude control mode to the fine control mode. That is, the operation control panel 4 changes over from an operation based on displacement of the operation panel 11 to an operation based on the instruction from the display unit 12.

Instructions with respect to the moving direction of the telescope unit 19 and the amount of moving are given so that the measuring point and the sighting position will coincide on the display unit 12. At the moment when the measuring point and the sighting position coincide, a distance measurement is performed. Horizontal angle of collimation position is determined by the horizontal angle encoder 7, and an elevation angle of the sighting position is measured by the vertical angle encoder 24.

Next, description will be given on operation of the surveying instrument 1 under the condition where the operation panel 11 is removed from the rotary operation support 9.

Under the condition where the rotary operation support 9 is removed, the crude control mode is executed according to the direction and the tilting as detected by the posture sensor 46.

Based on the direction and the amount of tilting detected by the posture sensor 46, a horizontal driving command and an elevation driving command to operate the telescope unit 19 are prepared by the operation panel arithmetic unit 39. The posture sensor 46 detects an amount of change of direction and an amount of change of the tilt angle at each moment, and the horizontal driving command and the elevation driving command are prepared according to amounts of relative change. The horizontal driving command and the elevation driving command are transmitted to the main element control unit 14 by the operation panel communication unit 42.

The horizontal driving command and the elevation driving command are received by the main communication unit 33, and the main arithmetic unit 31 drives and controls the horizontal rotation driving unit 15 and the vertical rotation driving unit 23 based on the horizontal drive command and the elevation driving command.

Therefore, when the operator moves the operation panel 11 in a direction, in which the telescope unit 19 is to be moved, the telescope unit 19 is rotated in horizontal direction or in elevation direction by following after the movement of the operation panel 11.

It may be so arranged that the result detected by the posture sensor 46 is transmitted to the main element control unit 14, and the horizontal driving command and the elevation driving command are prepared by the main arithmetic unit 31.

When a point to be measured is turned to a condition where the point to be measured is within a range as required with respect to the sighting position, the control mode is changed over from crude control mode to fine control mode. That is, the control mode is changed over from the operation based on displacement of the operation panel 11 to the operation based on an instruction from the display unit 12.

The preparation of the command based on the detection result of the posture sensor 46 is stopped, and the instruction from the display unit 12 is transmitted to the main element control unit 14 from the operation panel communication unit 42 as control command.

An image to indicate a sighting condition is displayed on the display unit 12, and commands with respect to the direction of moving and the amount of moving, of the telescope unit 19, are issued. At the moment when the measurement point and the sighting position coincide, the distance is measured. A horizontal angle of the sighting position is measured by the horizontal angle encoder 7, and an elevation angle of the sighting position is measured by the vertical angle encoder 24.

As described above, when sighting is performed by the telescope unit 19 to the measurement point, the telescope unit 19 can be operated by giving displacement to the operation panel 11 in a direction, in which the telescope unit 19 is to be moved. As a result, operator's sense of operation and movement of the telescope unit 19 correspond well to each other, and operation efficiency can be improved.

The invention claimed is:

1. A surveying instrument which has a measuring unit comprising an operation control panel rotatably mounted about a vertical axis on said measuring unit, wherein the vertical axis is the center of said measuring unit, and a relative angle detecting means for detecting a relative angle of said operation control panel and said measuring unit, wherein said operation control panel is so arranged that a command is issued to relatively rotate said measuring unit based on the relative angle detected by said relative angle detecting means.

2. A surveying instrument according to claim 1, wherein said operation control panel further comprises an operation panel, being rotatable around horizontal axis as the center of rotation, wherein said operation panel has vertical rotation angle detecting means, and issues a control command to said surveying instrument to rotate vertically based on a vertical angle detected by said vertical rotation angle detecting means.

3. A surveying instrument according to claim 2, wherein said operation panel has a display unit to fulfill function as a touch panel and issues a control command for crude control mode based on change of posture of said operation panel, and based on an instruction from said operation panel is adapted to be issued as a control command for fine control mode.

4. A surveying instrument according to claim 2, wherein said operation panel is designed as freely attachable and removable, has a posture sensor, and issues a control command for horizontal rotation and vertical rotation to said surveying instrument based on a detection result of the posture sensor.

5. A surveying instrument according to claim 4, wherein said operation panel has a display unit to fulfill function as a touch panel and issues a control command for crude control mode based on change of posture of said operation panel, and based on an instruction from said operation panel is adapted to be issued as a control command for fine control mode.

6. A surveying instrument according to claim 1, wherein said operation panel is designed as freely attachable and removable, has a posture sensor, and issues a control command for horizontal rotation and vertical rotation to said surveying instrument based on a detection result of the posture sensor.

7. A surveying instrument according to claim 6, wherein said operation panel has a display unit to fulfill function as a touch panel and issues a control command for crude control mode based on change of posture of said operation panel, and based on an instruction from said operation panel is adapted to be issued as a control command for fine control mode.

8. A surveying instrument, further comprising a leveling unit to fulfill leveling function, a rotation base where a telescope unit is provided, an operation control panel provided rotatably in horizontal direction with respect to said rotation base, a horizontal rotation driving unit for rotating said rotation base in horizontal direction, and a main element control unit for controlling said horizontal rotation driving unit, wherein said operation control panel has a relative angle detector for detecting relative rotation angle with respect to said rotation base, and said main element control unit controls said horizontal rotation driving unit so that said rotation base is rotated in horizontal direction based on relative rotation angle detected by said relative angle detector.

9. A surveying instrument according to claim 8, wherein said rotation base comprises said telescope unit rotatably supported in vertical direction and a vertical rotation driving unit for rotating the telescope unit in vertical direction, wherein said operation control panel comprises a rotary operation support rotatable in horizontal direction with respect to said rotation base, an operation panel rotatably mounted as rotatable in vertical direction on said rotary operation support, and a vertical angle detecting means for detecting vertical angle of the operation panel, and wherein said main element control unit controls said vertical rotation driving unit so as to vertically rotate said telescope unit based on a vertical angle detected by said vertical angle detecting means.

10. A surveying instrument according to claim 9, wherein said rotation base has a main communication unit, said operation control panel has said operation panel designed as freely attachable and removable, said operation panel has a posture sensor and an operation panel communication unit, a detection result of said posture sensor is transmitted from the operation panel communication unit to said main element control unit, and wherein the main element control unit controls said horizontal rotation driving unit and said vertical rotation driving unit based on a detection result of said posture sensor received via said main communication unit.

11. A surveying instrument according to claim 10, wherein said main element control unit can control said horizontal rotation driving unit and said vertical rotation driving unit in two modes of crude control mode and fine control mode, wherein said operation panel has a display unit to fulfill function as a touch panel, issues a control command for crude control mode based on a posture change of said operation panel and a control command for fine control mode based on an instruction from said operation panel.

12. A surveying instrument according to claim 11, wherein said rotation base has a horizontal rotation shaft rotated integrally and a horizontal angle encoder for detecting horizontal angle is provided inside the horizontal rotation shaft and wherein said telescope unit has a vertical rotation shaft rotated integrally and a vertical angle encoder for detecting vertical angle is provided inside the vertical rotation shaft.

13. A surveying instrument according to claim 10, wherein said rotation base has a horizontal rotation shaft rotated integrally and a horizontal angle encoder for detecting horizontal angle is provided inside the horizontal rotation shaft and wherein said telescope unit has a vertical rotation shaft rotated integrally and a vertical angle encoder for detecting vertical angle is provided inside the vertical rotation shaft.

14. A surveying instrument according to claim 9, wherein said main element control unit can control said horizontal rotation driving unit and said vertical rotation driving unit in two modes of crude control mode and fine control mode, wherein said operation panel has a display unit to fulfill function as a touch panel, issues a control command for crude control mode based on a posture change of said operation panel and a control command for fine control mode based on an instruction from said operation panel.

15. A surveying instrument according to claim 14, wherein said rotation base has a horizontal rotation shaft rotated integrally and a horizontal angle encoder for detecting horizontal angle is provided inside the horizontal rotation shaft and wherein said telescope unit has a vertical rotation shaft rotated integrally and a vertical angle encoder for detecting vertical angle is provided inside the vertical rotation shaft.

16. A surveying instrument according to claim 9, wherein said relative angle detector has a reference position and detects a relative rotation displacement from said reference position and outputs as a relative rotation angle.

17. A surveying instrument according to claim 9, wherein said rotation base has a horizontal rotation shaft rotated integrally and a horizontal angle encoder for detecting horizontal angle is provided inside the horizontal rotation shaft and wherein said telescope unit has a vertical rotation shaft rotated integrally and a vertical angle encoder for detecting vertical angle is provided inside the vertical rotation shaft.

* * * * *